(12) United States Patent
Asayama et al.

(10) Patent No.: US 10,710,505 B2
(45) Date of Patent: Jul. 14, 2020

(54) BIRD'S-EYE VIEW VIDEO GENERATION DEVICE, BIRD'S-EYE VIEW VIDEO GENERATION SYSTEM, BIRD'S-EYE VIEW VIDEO GENERATION METHOD, AND NON-TRANSITORY STORAGE MEDIUM

(71) Applicant: JVC KENWOOD Corporation, Yokohama-shi, Kanagawa (JP)

(72) Inventors: Manabu Asayama, Yokohama (JP); Tsuneo Satomi, Yokohama (JP); Toshio Mori, Yokohama (JP)

(73) Assignee: JVC KENWOOD Corporation, Yokohama-Shi (JP)

( * ) Notice: Subject to any disclaimer, the term of this patent is extended or adjusted under 35 U.S.C. 154(b) by 0 days.

(21) Appl. No.: 16/208,654

(22) Filed: Dec. 4, 2018

(65) Prior Publication Data

US 2019/0100144 A1 Apr. 4, 2019

Related U.S. Application Data

(63) Continuation of application No. PCT/JP2017/035836, filed on Oct. 2, 2017.

(30) Foreign Application Priority Data

Nov. 25, 2016 (JP) .................................. 2016-229019

(51) Int. Cl.
*H04N 7/18* (2006.01)
*B60R 1/00* (2006.01)
(Continued)

(52) U.S. Cl.
CPC ................ *B60R 1/00* (2013.01); *B60R 11/04* (2013.01); *G06K 9/00805* (2013.01); *G06T 7/70* (2017.01);
(Continued)

(58) Field of Classification Search
CPC ....................................................... G08G 9/02
See application file for complete search history.

(56) References Cited

U.S. PATENT DOCUMENTS

2002/0186228 A1* 12/2002 Kobayashi ............. B60K 35/00
345/633
2005/0031169 A1* 2/2005 Shulman ............ G01C 21/3647
382/104
(Continued)

FOREIGN PATENT DOCUMENTS

| JP | 2007-336230 | 12/2007 |
|---|---|---|
| JP | 2011-091527 | 5/2011 |
| JP | 2011-251681 | 12/2011 |

OTHER PUBLICATIONS

International Search Report and Written Opinion for International Patent Application No. PCT/JP20171035836 dated Dec. 19, 2017, 11 pages.

*Primary Examiner* — Nabil H Syed
*Assistant Examiner* — Cal J Eustaquio
(74) *Attorney, Agent, or Firm* — Amin, Turocy & Watson, LLP

(57) ABSTRACT

A bird's-eye view video generation device includes a video data acquiring unit that acquires videos from multiple cameras capturing videos of front, rear, a left side, and a right side of a vehicle, an obstacle information acquiring unit that acquires information from an obstacle sensor detecting at least one obstacle around the vehicle, a bird's-eye view video generating unit that generates a bird's-eye view video by synthesizing videos converted by a viewpoint conversion process on the acquired videos and generate, when the obstacle information acquiring unit detects the obstacle, the bird's-eye view video where a display region in a direction of the detected obstacle is extended by reducing a display area of the video in a direction orthogonal to the direction of
(Continued)

the detected obstacle toward a direction opposite to the direction of the detected obstacle, and a display controller that displays the generated bird's-eye view video on a display.

10 Claims, 8 Drawing Sheets

(51) Int. Cl.
*B60R 11/04* (2006.01)
*G06K 9/00* (2006.01)
*G06T 7/70* (2017.01)

(52) U.S. Cl.
CPC .............. *H04N 7/18* (2013.01); *H04N 7/181* (2013.01); *B60R 2300/105* (2013.01); *B60R 2300/607* (2013.01); *G06T 2207/10016* (2013.01); *G06T 2207/30261* (2013.01)

(56) References Cited

U.S. PATENT DOCUMENTS

| | | |
|---|---|---|
| 2012/0120240 A1 | 5/2012 | Muramatsu et al. |
| 2014/0002660 A1* | 1/2014 | Takahashi ................. B60R 1/00 348/148 |
| 2015/0009329 A1* | 1/2015 | Ishimoto ................... B60R 1/00 348/148 |
| 2019/0014290 A1* | 1/2019 | Dellantoni ......... G01C 21/3602 |

* cited by examiner

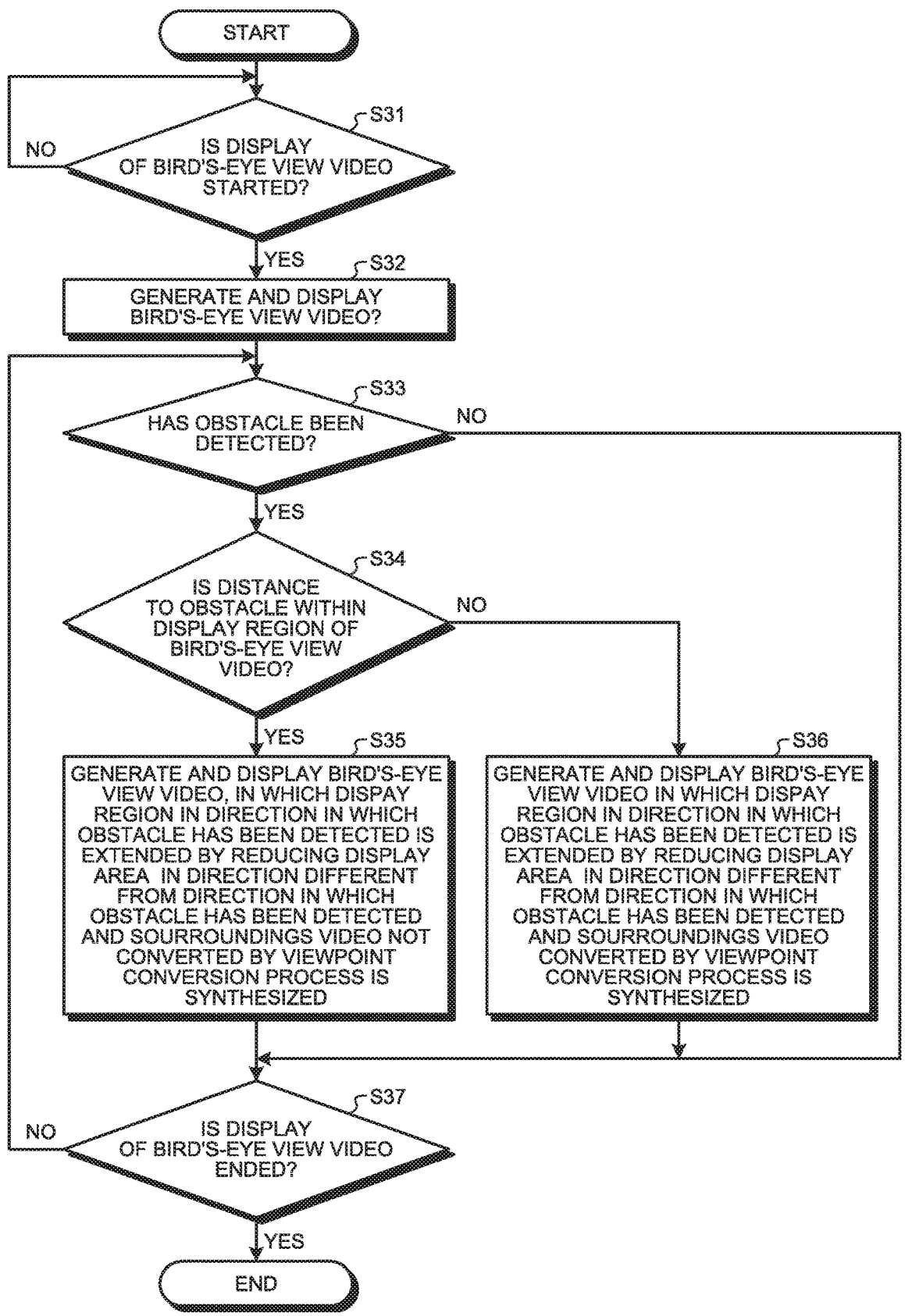

BIRD'S-EYE VIEW VIDEO GENERATION DEVICE, BIRD'S-EYE VIEW VIDEO GENERATION SYSTEM, BIRD'S-EYE VIEW VIDEO GENERATION METHOD, AND NON-TRANSITORY STORAGE MEDIUM

CROSS-REFERENCE TO RELATED APPLICATIONS

This application is a Continuation of International Application No. PCT/JP2017/035836, filed on Oct. 2, 2017 which claims the benefit of priority of the prior Japanese Patent Application No. 2016-229019, filed on Nov. 25, 2016, the entire contents of which are incorporated herein by reference.

FIELD

The present application relates to a bird's-eye view video generation device, a bird's-eye view video generation system, a bird's-eye view video generation method, and a non-transitory storage medium.

BACKGROUND

A technology for capturing videos of surroundings of a vehicle with cameras that are arranged around the vehicle and displaying, on a monitor, a bird's-eye view video obtained by performing a viewpoint conversion process on the captured videos is known. However, distortion in the bird's-eye view video increases with distance from a center thereof. Therefore, a shape of an obstacle located in the center of the bird's-eye view video, i.e., a shape of an obstacle located close to the vehicle can be clearly recognized. In contrast, the shape of the obstacle located in outer peripheries of the video, i.e., the shape of the obstacle located distant from the vehicle is not clearly shown.

To cope with this situation, a technology for displaying, when an obstacle is detected, a bird's-eye view video and a direct video that is obtained by capturing a video in a direction of the obstacle with respect to the vehicle is known (for example, see Japanese Laid-open Patent Publication No. 2011-251681).

In this technology, it is necessary to prepare a display region for displaying the direct video in addition to a display region for displaying the bird's-eye view video. For example, a navigation screen or an audio screen displayed in a side portion of the display region of the bird's-eye view video is temporarily hidden for use as the display region for displaying the direct video. Therefore, when a user wants to check the navigation screen or the audio screen, the user needs to change the display to display the navigation screen or the audio screen.

SUMMARY

A bird's-eye view video generation device, a bird's-eye view video generation system, a bird's-eye view video generation method, and a non-transitory storage medium are disclosed.

According to one aspect, there is provided a bird's-eye view video generation device comprising: a video data acquiring unit configured to acquire videos from a plurality of cameras configured to capture videos of front, rear, a left side, and a right side of a vehicle; an obstacle information acquiring unit configured to acquire information from an obstacle sensor configured to detect at least one obstacle around the vehicle; a bird's-eye view video generating unit configured to: generate a bird's-eye view video in which the vehicle is viewed from above by synthesizing videos that are obtained by performing a viewpoint conversion process on the videos acquired by the video data acquiring unit; and generate, when the obstacle information acquiring unit detects the obstacle, the bird's-eye view video in which a display region of the bird's-eye view video in a direction in which the obstacle has been detected is extended by reducing a display area of the video in a direction orthogonal to the direction in which the obstacle has been detected toward a direction opposite to the direction in which the obstacle has been detected; and a display controller configured to display the bird's-eye view video generated by the bird's-eye view video generating unit on a display.

According to one aspect, there is provided a bird's-eye view video generation method comprising: acquiring videos from a plurality of cameras configured to capture videos of front, rear, a left side, and a right side of a vehicle; acquiring information from an obstacle sensor configured to detect at least one obstacle around the vehicle; generating a bird's-eye view video in which the vehicle is viewed from above by synthesizing videos that are obtained by performing a viewpoint conversion process on the acquired videos; and generating, when detecting the obstacle, the bird's-eye view video in which a display region of the bird's-eye view video in a direction in which the obstacle has been detected is extended by reducing a display area of the video in a direction orthogonal to the direction in which the obstacle has been detected toward a direction opposite to the direction in which the obstacle has been detected; and displaying the generated bird's-eye view video on a display.

According to one aspect, there is provided a non-transitory storage medium that stores a program causing a computer that operates as a bird's-eye view video generation device to execute: acquiring information from an obstacle sensor configured to detect at least one obstacle around the vehicle; generating a bird's-eye view video in which the vehicle is viewed from above by synthesizing videos that are obtained by performing a viewpoint conversion process on the acquired videos; and generating, when detecting the obstacle, the bird's-eye view video in which a display region of the bird's-eye view video in a direction in which the obstacle has been detected is extended by reducing a display area of the video in a direction orthogonal to the direction in which the obstacle has been detected toward a direction opposite to the direction in which the obstacle has been detected; and displaying the generated bird's-eye view video on a display.

The above and other objects, features, advantages and technical and industrial significance of this application will be better understood by reading the following detailed description of presently preferred embodiments of the application, when considered in connection with the accompanying drawings.

BRIEF DESCRIPTION OF THE DRAWINGS

FIG. 11 is a flowchart illustrating flow of processes performed by a bird's-eye view video generation device of a bird's-eye view video generation system according to a sixth embodiment.

DETAILED DESCRIPTION OF THE PREFERRED EMBODIMENTS

Embodiments of a bird's-eye view video generation device 40, a bird's-eye view video generation system 1, a bird's-eye view video generation method, and a non-transitory storage medium according to the present application will be described in detail below with reference to the accompanying drawings. The present application is not limited by the embodiments below.

First Embodiment

Figure 1:
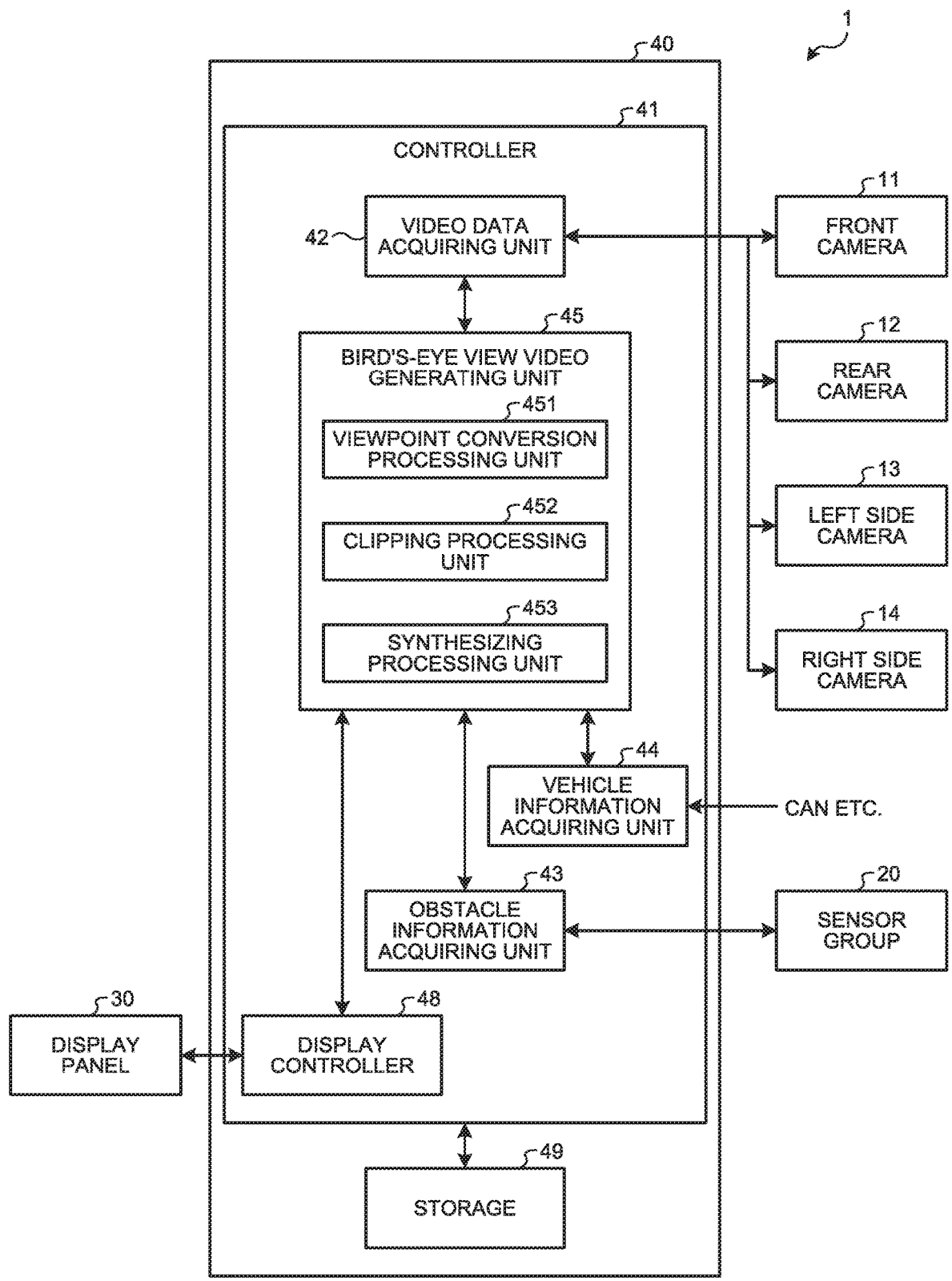
FIG. 1 is a block diagram illustrating an exemplary configuration of a bird's-eye view video generation system according to a first embodiment.

FIG. 1 is a block diagram illustrating an exemplary configuration of a bird's-eye view video generation system according to a first embodiment. The bird's-eye view video generation system 1 is mounted on a vehicle. The bird's-eye view video generation system 1 may be a device mounted on a vehicle or a device portable and usable in a vehicle.

The bird's-eye view video generation system 1 will be described with reference to FIG. 1. The bird's-eye view video generation system 1 includes a front camera 11, a rear camera 12, a left side camera 13, a right side camera 14, a sensor group (obstacle sensor) 20, a display panel (display) 30, and the bird's-eye view video generation device 40.

Figure 2:
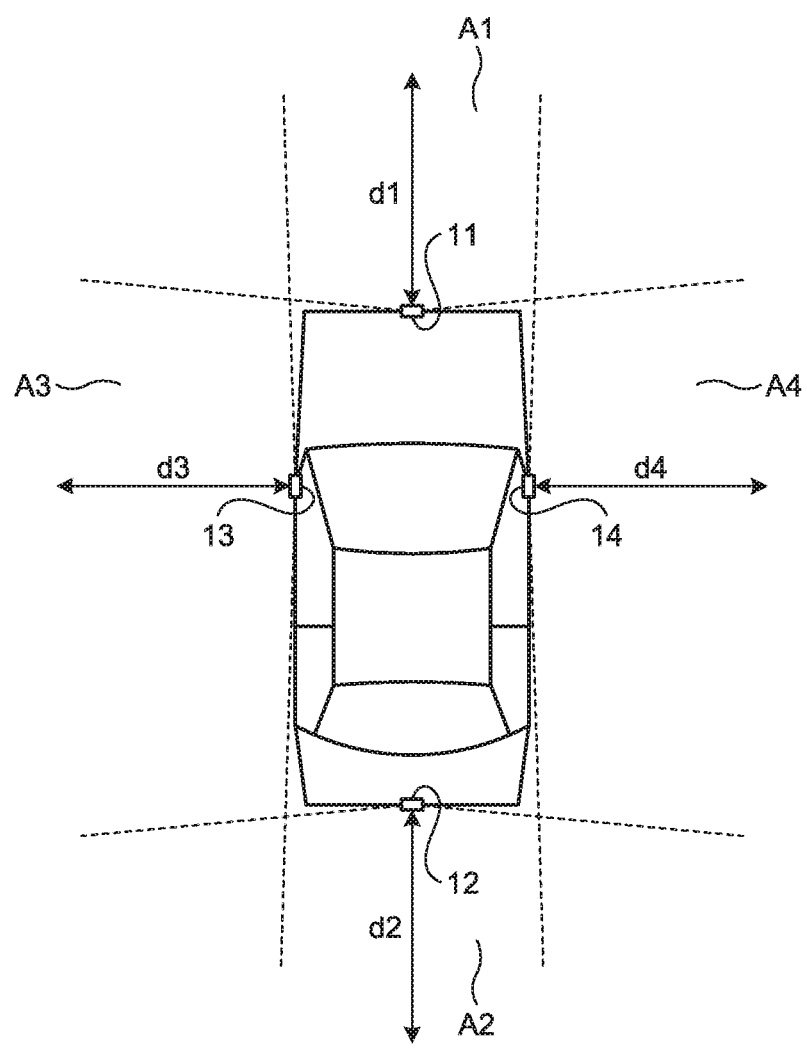
FIG. 2 is a schematic diagram for explaining imaging regions of cameras and regions included in a bird's-eye view video in the bird's-eye view video generation system according to the first embodiment.

The front camera 11, the rear camera 12, the left side camera 13, and the right side camera 14 will be described with reference to FIG. 2. FIG. 2 is a schematic diagram for explaining imaging regions of the cameras and regions contained in a bird's-eye view video in the bird's-eye view video generation system according to the first embodiment. The front camera 11 is arranged on a front of a vehicle and captures a video of surroundings around the front of the vehicle. The front camera 11 captures a video of, for example, an imaging region A1 of approximately 180 degrees. In the present embodiment, a region up to a distance d1 of about 2 meters from the vehicle within the imaging region A1 is contained in a normal bird's-eye view video 120 (see FIG. 3). The front camera 11 outputs the captured video to a video data acquiring unit 42 of the bird's-eye view video generation device 40.

The rear camera 12 is arranged on a rear of the vehicle and captures a video of surroundings around the rear of the vehicle. The rear camera 12 captures a video of, for example, an imaging region A2 of approximately 180 degrees. In the present embodiment, a region up to a distance d2 of about 2 meters from the vehicle within the imaging region A2 is contained in the normal bird's-eye view video 120. The rear camera 12 outputs the captured video to the video data acquiring unit 42 of the bird's-eye view video generation device 40.

The left side camera 13 is arranged on a left side of the vehicle and captures a video of surroundings around the left side of the vehicle. The left side camera 13 captures a video of, for example, an imaging region A3 of approximately 180 degrees. In the present embodiment, a region up to a distance d3 of about 2 meters from the vehicle within the imaging region A3 is contained in the normal bird's-eye view video 120. The left side camera 13 outputs the captured video to the video data acquiring unit 42 of the bird's-eye view video generation device 40.

The right side camera 14 is arranged on a right side of the vehicle and captures a video of surroundings around the right side of the vehicle. The right side camera 14 captures a video of, for example, an imaging region A4 of approximately 180 degrees. In the present embodiment, a region up to a distance d4 of about 2 meters from the vehicle within the imaging region A4 is contained in the normal bird's-eye view video 120. The right side camera 14 outputs the captured video to the video data acquiring unit 42 of the bird's-eye view video generation device 40.

The front camera 11, the rear camera 12, the left side camera 13, and the right side camera 14 as described above capture the videos of entire surroundings around the vehicle.

Referring back to FIG. 1, the sensor group 20 detects at least one obstacle around the vehicle. The sensor group 20 is able to detect the obstacle in a region including a display region of a bird's-eye view video that is obtained when the obstacle is not detected. The sensor group 20 is able to detect the obstacle located further away from the display region of the bird's-eye view video. In the present embodiment, the sensor group 20 includes a front sensor, a rear sensor, a left side sensor, and a right side sensor. The sensor group 20 is able to sense distances from several tens meters to several hundred meters depending on sensing methods; however, when used for the present embodiment, the sensor group detects an obstacle within a distance of about 5 meters from the vehicle. The sensor group 20 may adopt various types of sensors, such as an infrared sensor, an ultrasonic sensor, a millimeter-wave sensor, or any sensor using image recognition, for example.

The front sensor is arranged on the front of the vehicle and detects at least one obstacle located on the front of the vehicle. The front sensor detects the object that has a height above the ground and that may come into contact with the vehicle. The front sensor detects the obstacle within a distance of about 5 meters from the vehicle, for example. A detection region of the front sensor overlaps with the imaging region A1 of the front camera 11. The detection region of the front sensor may overlap with a part of the detection regions of the left side sensor and the right side sensor. The front sensor may be configured with a combination of multiple sensors. The front sensor outputs obstacle information on the detected obstacle to an obstacle information acquiring unit 43 of the bird's-eye view video generation device 40.

The rear sensor is arranged on the rear of the vehicle and detects at least one obstacle located on the rear of the vehicle. The rear sensor detects the object that has a height above the ground and that may come into contact with the vehicle. The rear sensor detects the obstacle within a distance of about 5 meters from the vehicle, for example. A detection region of the rear sensor overlaps with the imaging region A2 of the rear camera 12. The detection region of the rear sensor may overlap with a part of the detection regions of the left side sensor and the right side sensor. The rear sensor may be configured with a combination of multiple sensors. The rear sensor outputs obstacle information on the detected obstacle to the obstacle information acquiring unit 43 of the bird's-eye view video generation device 40.

The left side sensor is arranged on the left side of the vehicle and detects at least one obstacle located on the left side of the vehicle. The left side sensor detects the object that has a height above the ground and that may come into contact with the vehicle. The left side sensor detects the obstacle within a distance of about 5 meters from the vehicle, for example. The detection region of the left side sensor overlaps with the imaging region A3 of the left side camera 13. The detection region of the left side sensor may overlap with a part of the detection regions of the front sensor and the rear sensor. The left side sensor may be configured with a combination of multiple sensors. The left side sensor outputs obstacle information on the detected obstacle to the obstacle information acquiring unit 43 of the bird's-eye view video generation device 40.

The right side sensor is arranged on the right side of the vehicle and detects at least one obstacle located on the right side of the vehicle. The right side sensor detects the object that has a height above the ground and that may come into contact with the vehicle. The right side sensor detects the obstacle within a distance of about 5 meters from the vehicle, for example. The detection region of the right side sensor overlaps with the imaging region A4 of the right side camera 14. The detection region of the right side sensor may overlap with a part of the detection regions of the front sensor and the rear sensor. The right side sensor may be configured with a combination of multiple sensors. The right side sensor outputs obstacle information on the detected obstacle to the obstacle information acquiring unit 43 of the bird's-eye view video generation device 40.

Referring back to FIG. 1, the display panel 30 is, for example, a display including a liquid crystal display (LCD) or an organic electro-luminescence (EL) display. The display panel 30 displays the normal bird's-eye view video 120 and a bird's-eye view video 100 (see FIG. 4) based on a video signal that is output from the bird's-eye view video generation device 40 of the bird's-eye view video generation system 1. The display panel 30 may be dedicated to the bird's-eye view video generation system 1 or shared with other systems including a navigation system, for example. The display panel 30 is arranged at a position easily viewable by a driver of the vehicle.

When the display panel 30 is formed in a horizontally-long rectangular shape, the display panel 30 may be divided into a plurality of display regions. For example, the display panel 30 includes one display region that displays the normal bird's-eye view video 120 and the bird's-eye view video 100 and another display region that is arranged in a side portion of the display region of the normal bird's-eye view video 120 and the bird's-eye view video 100 and that displays a navigation screen or an audio screen. The display region that displays the normal bird's-eye view video 120 and the bird's-eye view video 100 has a vertically-long rectangular shape.

The bird's-eye view video generation device 40 includes a controller 41 and a storage 49.

The controller 41 is an arithmetic processing device configured with a central processing unit (CPU) or the like, for example. The controller 41 loads a program stored in the storage 49 onto a memory and executes commands contained in the program. The controller 41 includes the video data acquiring unit 42, the obstacle information acquiring unit 43, a vehicle information acquiring unit 44, a bird's-eye view video generating unit 45, and a display controller 48.

The video data acquiring unit 42 acquires surroundings video data obtained by capturing video of surroundings of the vehicle. More specifically, the video data acquiring unit 42 acquires pieces of surroundings video data output by the front camera 11, the rear camera 12, the left side camera 13, and the right side camera 14. The video data acquiring unit 42 stores the pieces of acquired surroundings video data in the storage 49 and outputs the pieces of acquired surroundings video data to the bird's-eye view video generating unit 45.

The obstacle information acquiring unit 43 acquires the obstacle information on the obstacle that is detected around the vehicle. More specifically, the obstacle information acquiring unit 43 acquires the obstacle information output by the sensor group 20. In the present embodiment, the obstacle information acquiring unit 43 acquires the obstacle information including a distance to the detected obstacle. The obstacle information acquiring unit 43 outputs the acquired obstacle information to the bird's-eye view video generating unit 45.

The vehicle information acquiring unit 44 acquires vehicle information, such as vehicle's gear operation information, which is to be used as a trigger to display the normal bird's-eye view video 120, from a controller area network (CAN), various sensors that sense a situation of the vehicle, or the like. The vehicle information acquiring unit 44 outputs the acquired vehicle information to the bird's-eye view video generating unit 45.

The bird's-eye view video generating unit 45 generates the normal bird's-eye view video 120 and the bird's-eye view video 100, in each of which the vehicle is viewed from above, by performing a viewpoint conversion process on the pieces of surroundings video data acquired by the video data acquiring unit 42 and synthesizing the pieces of converted data.

Figure 3:
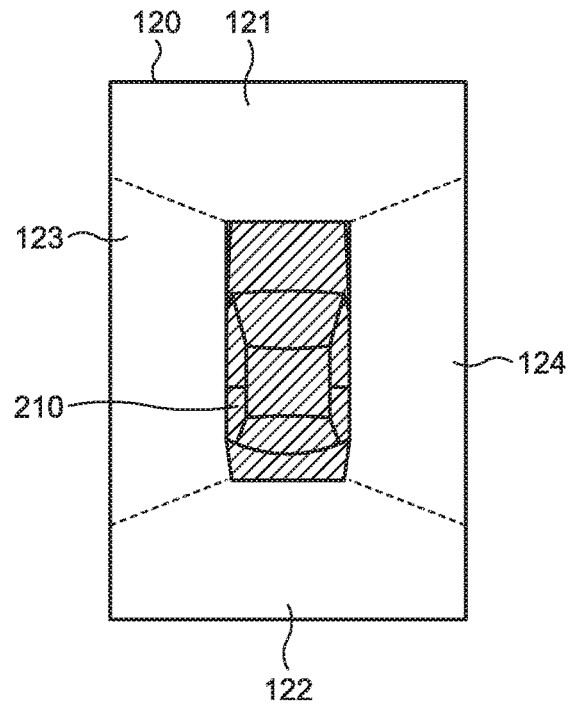
FIG. 3 is a diagram illustrating a normal bird's-eye view video generated by the bird's-eye view video generation system according to the first embodiment.

The normal bird's-eye view video 120 will be described with reference to FIG. 3. FIG. 3 is a diagram illustrating the normal bird's-eye view video generated by the bird's-eye view video generation system according to the first embodiment. The normal bird's-eye view video 120 contains a front video 121, a rear video 122, a left side video 123, and a right side video 124. A vehicle icon 210 representing the vehicle is displayed in a center of the normal bird's-eye view video 120.

In FIG. 3, dashed lines indicating boundaries between the front video 121, the rear video 122, the left side video 123, and the right side video 124 are illustrated for convenience of explanation, but it does not matter whether or not the dashed lines are displayed in the normal bird's-eye view video 120 that is actually displayed on the display panel 30. The same applies to the other drawings.

The bird's-eye view video generating unit 45, when the obstacle information acquiring unit 43 detects the obstacle, generates the bird's-eye view video 100 by, in the normal bird's-eye view video 120, reducing a display area of the video in at least one direction different from a direction in which the obstacle has been detected and extending a display region in the direction in which the obstacle has been detected.

Referring back to FIG. 1, the bird's-eye view video generating unit 45 includes a viewpoint conversion processing unit 451, a clipping processing unit 452, and a synthesizing processing unit 453.

The viewpoint conversion processing unit 451 performs, on the pieces of surroundings video data acquired by the video data acquiring unit 42, a viewpoint conversion process such that the vehicle is looked down from above. More specifically, the viewpoint conversion processing unit 451 generates viewpoint-converted video data by the viewpoint conversion process based on the pieces of surroundings video data captured by the front camera 11, the rear camera 12, the left side camera 13, and the right side camera 14. Any well-known method may be adopted as a method of the viewpoint conversion process and the method is not specifically limited. The viewpoint conversion processing unit 451 stores the viewpoint-converted video data by the viewpoint conversion process in the storage 49.

The clipping processing unit 452 performs a clipping process of clipping a video of a predetermined region in the surroundings video data. A region to be clipped as a clipping region is registered and stored in advance. More specifically, the clipping processing unit 452 clips the region up to the distance d1 of about 2 meters from the vehicle in the surroundings video data obtained from the front camera 11. The clipping processing unit 452 clips the region up to the distance d2 of about 2 meters from the vehicle in the surroundings video data obtained from the rear camera 12. The clipping processing unit 452 clips the region up to the distance d3 of about 2 meters from the vehicle in the surroundings video data obtained from the left side camera 13. The clipping processing unit 452 clips the region up to the distance d4 of about 2 meters from the vehicle in the surroundings video data obtained from the right side camera 14. The clipping processing unit 452 stores the clipped video data by the clipping process in the storage 49.

When the obstacle information acquiring unit 43 detects the obstacle, the synthesizing processing unit 453 performs, in the normal bird's-eye view video 120, a reduction process on the video data such that a display area of the video in at least one direction different from a direction in which the obstacle has been detected is reduced and extends a display region that corresponds to the direction in which the obstacle has been detected to thereby generate the bird's-eye view video 100.

At least one direction different from the direction in which the obstacle has been detected includes a direction perpendicular to the the direction in which the obstacle has been detected, a direction opposite to the direction in which the obstacle has been detected, and a direction opposite to the direction in which the obstacle has been detected and a direction perpendicular to the direction in which the obstacle has been detected.

The process of reducing the display area of the video data is, as one example, a process of compressing an area of the video as compared to the normal bird's-eye view video 120. Hereinafter, this process will be referred to as a compression process. A direction in which the area of the video is compressed and reduced through the compression process may be a direction parallel to the direction in which the obstacle has been detected. For example, the compression process includes reduction of an entire video, clipping of a part of the video, and deletion of a part of the video. The compressed display area of the bird's-eye view video by the compression process is reduced relative to the normal bird's-eye view video 120.

In the present embodiment, when the obstacle is detected, the synthesizing processing unit 453 generates the bird's-eye view video 100 by performing the compression process on the video data such that the video in at least one direction different from the direction in which the obstacle has been detected is compressed and the display area is reduced, extending the display area in the direction in which the obstacle has been detected, and performing the viewpoint conversion process.

More specifically, when the obstacle is detected, the synthesizing processing unit 453 performs the compression process such that the video in at least one direction different from the direction in which the obstacle has been detected among the front video 121, the rear video 122, the left side video 123, and the right side video 124 of the normal bird's-eye view video 120 is displayed with being compressed in a direction opposite to the direction in which the obstacle has been detected. Subsequently, the synthesizing processing unit 453 performs the clipping process of the surroundings video data with extending a display region in the direction of the detected obstacle. Then, the synthesizing processing unit 453 performs the viewpoint conversion process on the clipped video data. Thereafter, the synthesizing processing unit 453 synthesizes the compressed video obtained by the compression process and the viewpoint-converted video obtained by the viewpoint conversion process on the surroundings video data in which the imaging region has been extended in the direction of the obstacle to generate the bird's-eye view video 100.

For example, when the obstacle is detected on the rear side, the synthesizing processing unit 453 performs the compression process on the video data such that at least one of the front video 121, the left side video 123, and the right side video 124 of the normal bird's-eye view video 120 is compressed on the front side and displayed. Then, the synthesizing processing unit 453 generates the bird's-eye view video 100 by synthesizing, in a region corresponding to a rear side of the bird's-eye view video 100 to be generated, the compressed video obtained by the compression process and the viewpoint-converted video obtained by the viewpoint conversion process on the surroundings video data in which the imaging region has been extended in the direction of the obstacle to generate the bird's-eye view video 100. In the present embodiment, when the obstacle is detected on the rear side, the synthesizing processing unit 453 performs the compression process such that the left side video 123 and the right side video 124 of the normal bird's-eye view video 120 are compressed in a front-rear direction (vertical direction) and displayed on the front side. Then, the synthesizing processing unit 453 generates the bird's-eye view video 100 by synthesizing, in the region corresponding to the rear side of the bird's-eye view video 100 to be generated, the compressed video obtained by the compression process and the viewpoint-converted video obtained by the viewpoint conversion process on the surroundings video data in which the imaging region has been extended in the direction of the obstacle. As for the surroundings video in which the imaging region has been extended in the direction of the obstacle, it may be possible to extend an imaging region in a size of a predetermined extension region, or extend the imaging region so as to cover an imaging region up to the detected obstacle based on information on a distance to the detected obstacle.

The synthesizing processing unit 453 stores the video data of the bird's-eye view video 100 generated as above in the storage 49.

Figure 4:
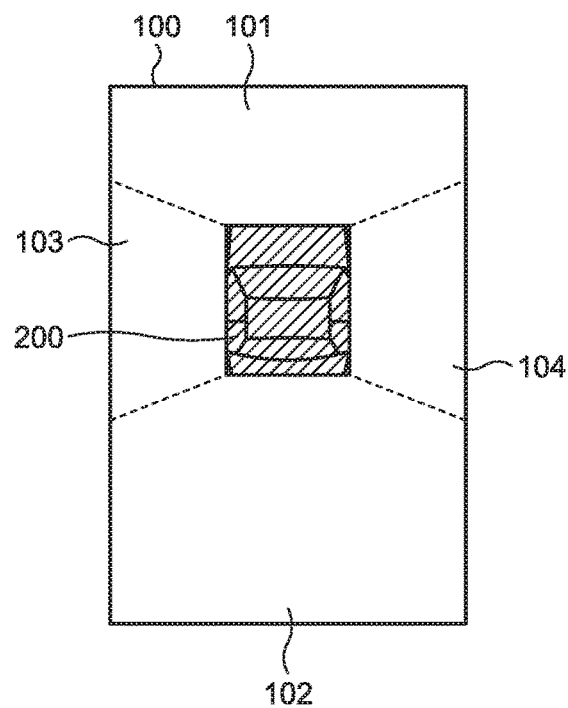
FIG. 4 is a diagram illustrating a bird's-eye view video generated by the bird's-eye view video generation system according to the first embodiment.

The bird's-eye view video 100 generated when the obstacle is detected on the rear side will be described with reference to FIG. 4. FIG. 4 is a diagram illustrating the bird's-eye view video generated by the bird's-eye view video generation system according to the first embodiment. The bird's-eye view video 100 contains a front video 101, a rear video 102, a left side video 103, and a right side video 104. A vehicle icon 200 representing the vehicle is displayed in a center of the bird's-eye view video 100. The bird's-eye view video 100 is generated with the same aspect ratio as that of the normal bird's-eye view video 120.

The front video 101 is the same video as the front video 121 of the normal bird's-eye view video 120. The rear video 102 is a video that is obtained by performing the clipping process of clipping a wider clipping region than the rear video 122 of the normal bird's-eye view video 120. When the obstacle located outside the display region of the normal bird's-eye view video 120 is detected, the rear video 102 contains a further imaging region than that of the normal bird's-eye view video 120. When the obstacle located outside the display region of the normal bird's-eye view video 120 is detected, the rear video 102 may contain a further imaging region than that of the normal bird's-eye view video 120 up to the detected obstacle. The left side video 103 is a video that is obtained by performing the compression process such that the left side video 123 of the normal bird's-eye view video 120 is displayed with being compressed in the vertical direction. The right side video 104 is a video that is obtained by performing the compression process such that the right side video 124 of the normal bird's-eye view video 120 is displayed with being compressed in the vertical direction. The vehicle icon 200 is a video that is obtained by performing the compression process such that the vehicle icon 210 of the normal bird's-eye view video 120 is displayed with being compressed in the vertical direction.

A compression rate of the left side video 103 and the right side video 104 is determined depending on the display region of the rear video 102. The display region of the rear video 102 and the compression rate of the left side video 103 and the right side video 104 may be fixed values that are determined in advance. The compression rate is equal to a reduction rate. Further, the display region of the rear video 102 may be determined based on the compression rate of the left side video 103 and the right side video 104, or the compression rate of the left side video 103 and the right side video 104 may be determined based on the display region of the rear video 102. Furthermore, a compression rate of the vehicle icon 210 is determined depending on the compression rate of the left side video 103 and the right side video 104. It is preferable to set the compression rate of the left side video 103 and the right side video 104 to about 30% to 50%.

Referring back to FIG. 1, the display controller 48 displays the normal bird's-eye view video 120 and the bird's-eye view video 100 on the display panel 30. The display controller 48 displays the normal bird's-eye view video 120 and the bird's-eye view video 100 in display regions with the same size on the display panel 30. More preferably, to maintain the continuity of display, the display controller 48 displays the normal bird's-eye view video 120 and the bird's-eye view video 100 in the same display region on the display panel 30.

The storage 49 stores therein data needed for various processes performed by the bird's-eye view video generation device 40 and various processing results. The storage 49 is a semiconductor memory device, such as a random access memory (RAM), a read only memory (ROM), or a flash memory, or a storage device, such as a hard disk or an optical disk, for example.

Figure 5:
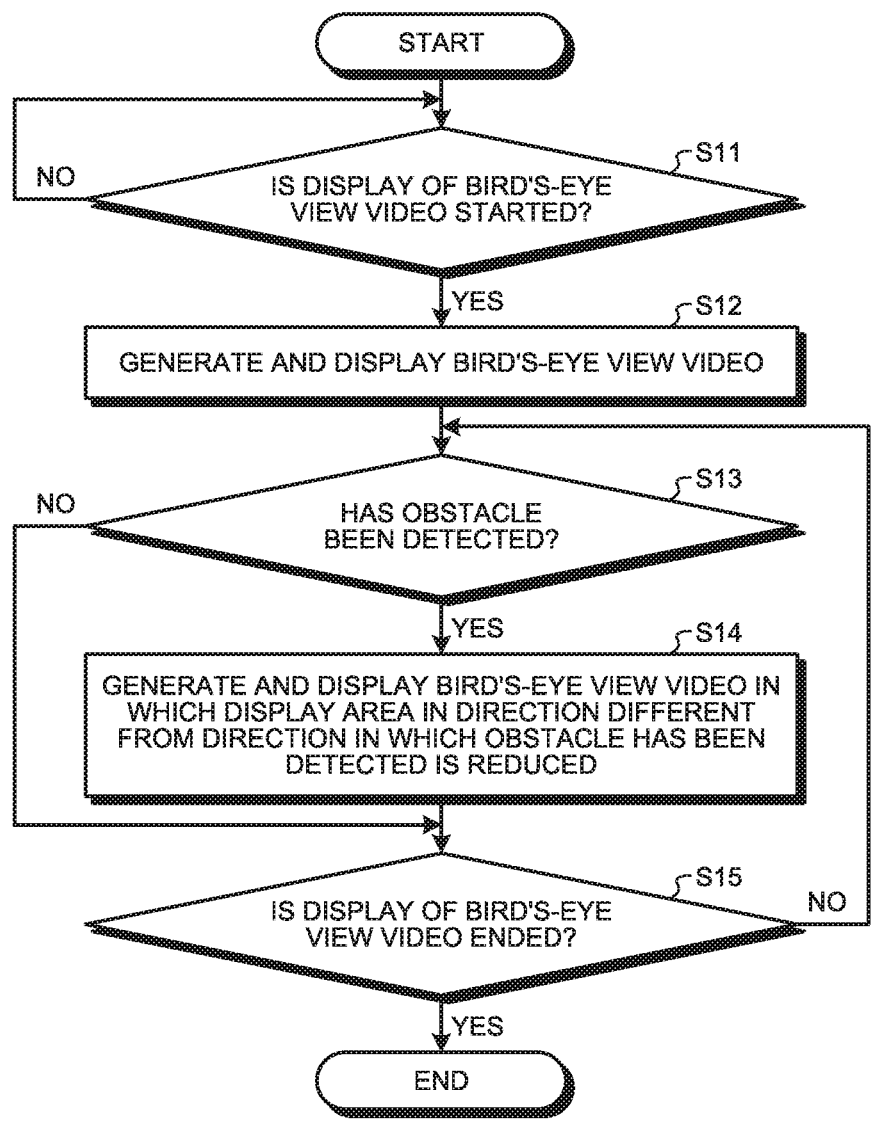
FIG. 5 is a flowchart illustrating flow of processes performed by a bird's-eye view video generation device of the bird's-eye view video generation system according to the first embodiment.

Next, flow of processes performed by the bird's-eye view video generation device 40 of the bird's-eye view video generation system 1 will be described with reference to FIG. 5. FIG. 5 is a flowchart illustrating the flow of the processes performed by the bird's-eye view video generation device of the bird's-eye view video generation system according to the first embodiment.

When the bird's-eye view video generation system 1 is activated, the controller 41 causes the video data acquiring unit 42 to acquire surroundings video data. The controller 41 causes the obstacle information acquiring unit 43 to acquire obstacle information.

The controller 41 determines whether to start displaying the bird's-eye view video (Step S11). In the present embodiment, the controller 41 determines whether to start displaying the bird's-eye view video based on presence or absence of a reverse trigger. The reverse trigger refers to, for example, a change of a shift position to the "reverse" position. Further, the reverse trigger refers to a change of a moving direction of the vehicle to the rearward direction with respect to the vehicle. When the reverse trigger is absent, the controller 41 determines not to start displaying the bird's-eye view video (NO at Step S11), and performs the process at Step S11 again. When the reverse trigger is present, the controller 41 determines to start displaying the bird's-eye view video (YES at Step S11), and proceeds to Step S12.

The controller 41 generates and displays the normal bird's-eye view video 120 (Step S12). More specifically, the controller 41 causes the bird's-eye view video generating unit 45 to generate the normal bird's-eye view video 120, in which the vehicle is looked down from above, by performing the viewpoint conversion process on the pieces of surroundings video data acquired by the video data acquiring unit 42. Then, the controller 41 causes the display controller 48 to display the generated normal bird's-eye view video 120 on the display panel 30.

The controller 41 determines whether at least one obstacle has been detected (Step S13). More specifically, the controller 41 determines whether the obstacle information acquiring unit 43 has acquired the obstacle information. If the controller 41 determines that the obstacle information acquiring unit 43 has acquired the obstacle information (YES at Step S13), the controller 41 proceeds to Step S14. If the controller 41 determines that the obstacle information acquiring unit 43 has not acquired the obstacle information (NO at Step S13), the controller 41 proceeds to Step S15.

The controller 41 causes the synthesizing processing unit 453 to generate and display the bird's-eye view video 100 in which a direction different from the direction in which the obstacle has been detected is compressed (Step S14).

Figure 6:
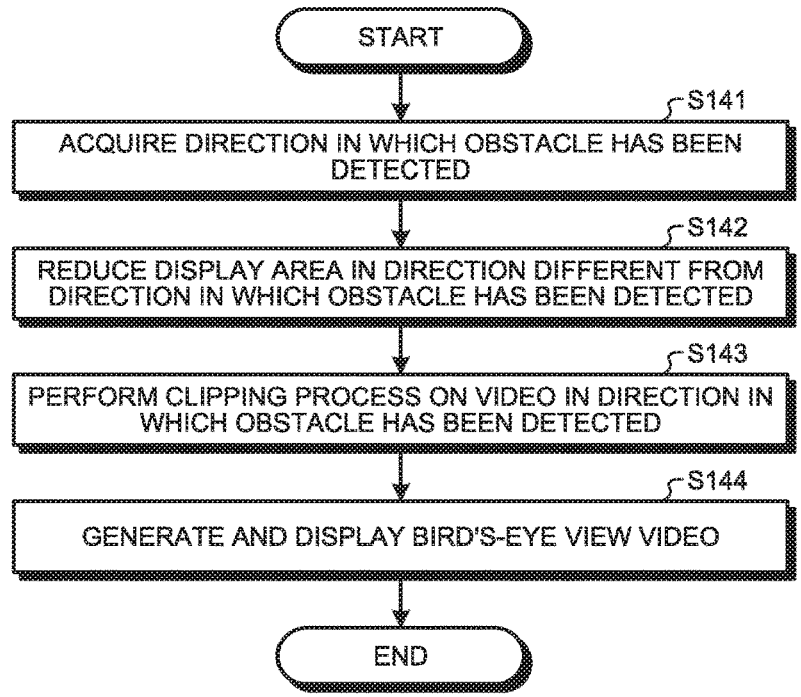
FIG. 6 is a flowchart illustrating a part of the flow of the processes in the flowchart illustrated in FIG. 5.

With reference to FIG. 6, the flow of the process at Step S14 will be described in detail below. FIG. 6 is a flowchart illustrating a part of the processes of the flow in the flowchart illustrated in FIG. 5.

The synthesizing processing unit 453 acquires the direction in which the obstacle has been detected (Step S141). The synthesizing processing unit 453 acquires the direction in which the obstacle has been detected based on the obstacle information that is acquired by the obstacle information acquiring unit 43 and that includes the obstacle located at the shortest distance. For example, if the obstacle information, which is acquired by the obstacle information acquiring unit 43 and which includes the obstacle located at the shortest distance, is an obstacle information obtained by the rear sensor, the synthesizing processing unit 453 determines that a direction of the detected obstacle is the rearward direction.

The synthesizing processing unit 453 performs the compression process such that the video in at least one direction different from the direction in which the obstacle has been detected is displayed in a compressed manner (Step S142). For example, if it is determined that the direction of the detected obstacle is the rearward direction at Step S141, the synthesizing processing unit 453 performs the compression process such that the left side video 123 and the right side video 124 of the normal bird's-eye view video 120 are compressed in the vertical direction and displayed on the front side.

The synthesizing processing unit 453 performs the clipping process in the direction in which the obstacle has been detected (Step S143). For example, if it is determined that the direction of the detected obstacle is the rearward direction at Step S141, the synthesizing processing unit 453 performs the clipping process on the surroundings video data obtained from the rear camera 12 so as to cover a further region as compared to a case in which the normal bird's-eye view video 120 is generated. The synthesizing processing unit 453 may perform the clipping process on the surroundings video data obtained from the rear camera 12 so as to cover an imaging region up to the detected obstacle.

The synthesizing processing unit 453 generates and displays the bird's-eye view video 100 (Step S144). For example, the synthesizing processing unit 453 synthesizes, in a region corresponding to the rear side of the compressed bird's-eye view video obtained by the compression process at Step S142, the rear video 102 that is obtained by performing the viewpoint conversion process on the clipped surroundings video data at Step S143 obtained by the clipping process on the video from the rear camera 12 to thereby generate the bird's-eye view video 100. Then, the synthesizing processing unit 453 causes the display controller 48 to display the bird's-eye view video 100 on the display panel 30.

Referring back to FIG. 5, the controller 41 determines whether to terminate display of the bird's-eye view video (Step S15). More specifically, the controller 41 determines whether to terminate the display of the bird's-eye view video based on the presence or the absence of the reverse trigger. If the reverse trigger is absent, i.e., if the reverse trigger is cancelled, the controller 41 determines to terminate the display of the bird's-eye view video (YES at Step S15), and terminates the process. If the reverse trigger is present, the controller 41 determines not to terminate the display of the bird's-eye view video (NO at Step S15), returns to Step S13, and continues the processes.

In this manner, when detecting the obstacle, the bird's-eye view video generation system 1 generates the bird's-eye view video 100 by, in the normal bird's-eye view video 120, performing the compression process such that the video in at least one direction different from the direction in which the obstacle has been detected is displayed in a compressed manner and extending the imaging region in the direction in which the obstacle has been detected so as to cover a wide imaging region or so as to cover the imaging region up to the detected obstacle.

As described above, in the present embodiment, when the obstacle is detected, the bird's-eye view video 100 is generated by, in the normal bird's-eye view video 120, performing the compression process such that the video in at least one direction different from the direction in which the obstacle has been detected is displayed in a compressed manner and extending the imaging region in the direction in which the obstacle has been detected so as to cover a wide imaging region or so as to cover a imaging region up to the detected obstacle. For example, in the present embodiment, when the obstacle is detected on the rear of the vehicle, the compression process is performed such that the left side video 123 and the right side video 124 of the normal bird's-eye view video 120 are displayed in a compressed manner. Then, in the present embodiment, the bird's-eye view video 100 is generated by synthesizing, in a region corresponding to the rear side of the compressed bird's-eye view video obtained by the compression process, the rear video 102 that is obtained by performing the viewpoint conversion process on the surroundings video data obtained from the rear camera 12. Accordingly, in the present embodiment, when the obstacle is detected, it is possible to display, in the same display region as that of the normal bird's-eye view video 120 on the display panel 30, the bird's-eye view video 100 in which the obstacle can be recognized earlier or the bird's-eye view video 100 which includes the imaging region up to the obstacle. In this manner, in the present embodiment, it is possible to check the obstacle around the vehicle appropriately.

In the present embodiment, it is possible to widen the display region for displaying the direction in which the obstacle has been detected in the bird's-eye view video 100, as compared to the display region in the normal bird's-eye view video 120. For example, when the obstacle is detected on the rear side, it is possible to widen the region of the rear video 102 of the bird's-eye view video 100 as compared to the rear video 122 of the normal bird's-eye view video 120. With this configuration, in the present embodiment, when the obstacle is detected, it is possible to display a wider region in the direction in which the obstacle has been detected in the bird's-eye view video 100. In this manner, in the present embodiment, it is possible to check the obstacle around the vehicle appropriately.

In addition, as described above, by widening the display region for displaying the video in the direction in which the obstacle has been detected in the bird's-eye view video 100 as compared to the display region in the normal bird's-eye view video 120, in the present embodiment, the obstacle can be displayed at a position closer to the vehicle icon 200 in the bird's-eye view video 100. In this manner, in the present embodiment, it is possible to reduce distortion of the obstacle in the bird's-eye view video 100 and improve visibility of the obstacle. According to the present embodiment, a driver of the vehicle can check the obstacle around the vehicle appropriately.

In the present embodiment, the normal bird's-eye view video 120 and the bird's-eye view video 100 are displayed in the same display region on the display panel 30. With this configuration, in the present embodiment, it is not necessary to temporarily hide a navigation screen or an audio screen in order to ensure a display region for displaying information indicating the obstacle. In this manner, in the present embodiment, it is possible to maintain the continuity of the display of the display panel 30.

Second Embodiment

Figure 7:
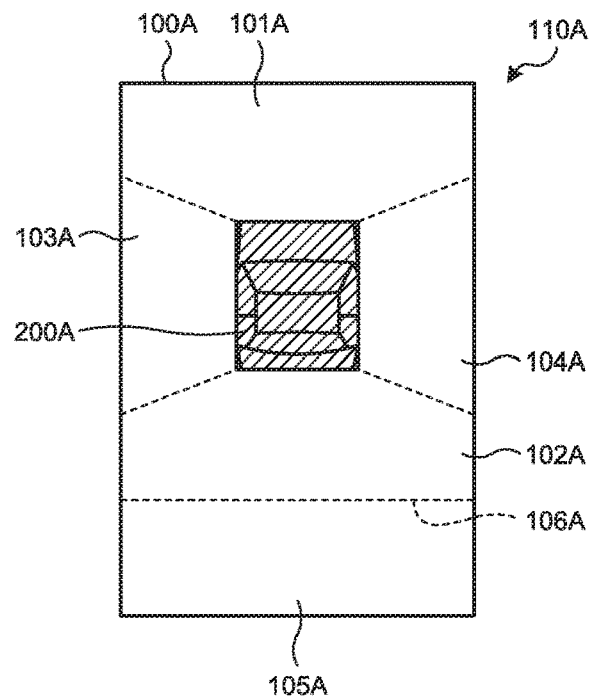
FIG. 7 is a diagram illustrating a bird's-eye view video generated by a bird's-eye view video generation system according to a second embodiment.

With reference to FIG. 7, a bird's-eye view video generation system 1 according to a second embodiment will be described. FIG. 7 is a diagram illustrating the bird's-eye view video generated by the bird's-eye view video generation system according to the second embodiment. A basic configuration of the bird's-eye view video generation system 1 is the same as the bird's-eye view video generation system 1 of the first embodiment. In the following description, the same components as those of the bird's-eye view video generation system 1 are denoted by the same reference signs or corresponding signs, and detailed explanation thereof will be omitted. The bird's-eye view video generation system 1 of the present embodiment is different from the bird's-eye view video generation system 1 of the first embodiment in that the synthesizing processing unit 453 performs different processes.

In the present embodiment, the video that is extended in the direction of the detected obstacle includes a video in the direction of the detected obstacle of the normal bird's-eye view video and a video in the direction of the detected obstacle that is not converted by the viewpoint conversion process. In other words, the display region is extended by adding the video of the video data directly from the camera arranged in the direction of the detected obstacle among the front camera 11, the rear camera 12, the left side camera 13, and the right side camera 14 to the bird's-eye view video.

When the obstacle information acquiring unit 43 detects the obstacle, the synthesizing processing unit 453 generates a bird's-eye view video 110A by synthesizing a bird's-eye view video 100A that is obtained by performing the compression process on the video data such that the display area of the video in at least one direction different from the direction in which the obstacle has been detected is reduced, and a surroundings video that is obtained from the rear camera 12 arranged in the direction in which the obstacle has been detected. More specifically, when the obstacle is detected, the synthesizing processing unit 453 generates the bird's-eye view video 100A by performing the compression process such that video data of the video in at least one direction different from the direction in which the obstacle has been detected among the front video 121, the rear video 122, the left side video 123, and the right side video 124 in the normal bird's-eye view video 120 is displayed with being compressed in a direction opposite to the direction in which the obstacle has been detected. Then, the synthesizing processing unit 453 generates the bird's-eye view video 110A by synthesizing the compressed bird's-eye view video 100A obtained by the compression process and the video of the surroundings video data corresponding to the direction in which the obstacle has been detected without being compressed by the compression process. The video of the surroundings video corresponding to the direction in which the obstacle has been detected is synthesized in a position that corresponds to the direction in which the obstacle has been detected in the compressed bird's-eye view video 100A.

The bird's-eye view video 110A obtained when the obstacle is detected on the rear side will be described with reference to FIG. 7. The bird's-eye view video 110A contains the bird's-eye view video 100A, which is compressed by the compression process and contains a front video 101A, a rear video 102A, a left side video 103A, and a right side video 104A, and a second rear video 105A. The front video 101A and the rear video 102A are the same videos as the front video 121 and the rear video 122 of the normal bird's-eye view video 120. The second rear video 105A is not a bird's-eye view video, but for descriptive purpose, a video in which the bird's-eye view video 100A and the second rear video 105A are synthesized will be referred to as the bird's-eye view video 110A. The left side video 103A and the right side video 104A are compressed by the compression process in the vertical direction similarly to the first embodiment. In this case, a vehicle icon 200A is compressed by the compression process in the vertical direction in accordance with the compression rate of the left side video 103A and the right side video 104A. The second rear video 105A is a surroundings video that is not converted by the viewpoint conversion process and that is obtained from the rear camera 12. The second rear video 105A is synthesized in a position corresponding to the rear side of the compressed bird's-eye view video 100A, i.e, in the lower side of the compressed bird's-eye view video 100A in FIG. 7. It is preferable that the second rear video 105A is a video that is obtained before execution of the clipping process for generating the rear video 102A, and in this case, it is possible to display a further region than the rear video 102A in the direction of the detected obstacle.

In FIG. 7, a dashed line 106A indicating a boundary between the bird's-eye view video 100A and the second rear video 105A is illustrated for convenience of explanation, but it does not matter whether or not the dashed line is displayed in the bird's-eye view video 110A that is actually displayed on the display panel 30.

As described above, in the present embodiment, when the obstacle is detected, the bird's-eye view video 110A is generated by, in the normal bird's-eye view video 120, performing the compression process such that the video in at least one direction different from the direction in which the obstacle has been detected is displayed in a compressed manner and synthesizing, in the direction in which the obstacle has been detected, the surroundings video corresponding to the direction of the detected obstacle, so that the display region is extended in the direction in which the obstacle has been detected. For example, in the present embodiment, when the obstacle is detected on the rear of the vehicle, the bird's-eye view video 110A is generated by synthesizing the compressed bird's-eye view video 100A and, in the direction in which the obstacle has been detected, the second rear video 105A that is the surroundings video obtained from the rear camera 12 that is arranged in the direction in which the obstacle has been detected. With this configuration, in the present embodiment, when the obstacle is detected, it is possible to display, in the same display region as the normal bird's-eye view video 120 on the display panel 30, the bird's-eye view video 110A in which the compressed bird's-eye view video 100A and the second rear video 105A that is not converted by the viewpoint conversion process and that corresponds to the direction in which the obstacle has been detected are synthesized. In this manner, in the present embodiment, it is possible to check the obstacle around the vehicle appropriately.

According to the present embodiment, a driver of the vehicle is able to check the obstacle using the bird's-eye view video 110A, in which the compressed bird's-eye view video 100A in the vertical direction and the second rear video 105A that is not converted by the viewpoint conversion process are synthesized. According to the present embodiment, the driver is able to check a height of the obstacle from the ground and a shape of the obstacle using the second rear video 105A.

Third Embodiment

Figure 8:
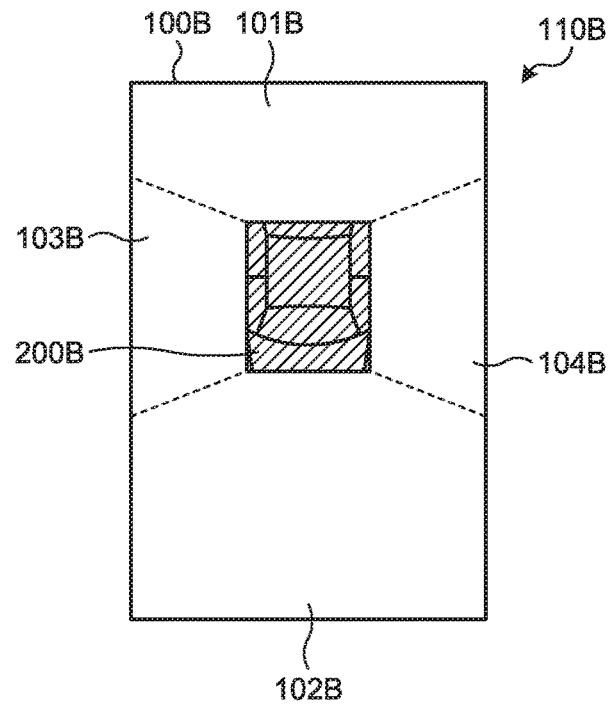
FIG. 8 is a diagram illustrating a bird's-eye view video generated by a bird's-eye view video generation system according to a third embodiment.

A bird's-eye view video generation system 1 according to a third embodiment will be described with reference to FIG. 8. FIG. 8 is a diagram illustrating a bird's-eye view video generated by the bird's-eye view video generation system according to the third embodiment. The bird's-eye view video generation system 1 according to the present embodiment is different from the bird's-eye view video generation system 1 of the first embodiment in that the synthesizing processing unit 453 performs different processes.

When the obstacle information acquiring unit 43 detects the obstacle, the synthesizing processing unit 453 generates a bird's-eye view video 100B by reducing a display area by shifting the normal bird's-eye view video 120 toward a direction opposite to the direction in which the obstacle has been detected, and synthesizing a video that is obtained by performing the viewpoint conversion process on a surroundings video data which has been obtained from the rear camera 12 and for which a display region has been extended so as to cover a wide imaging region in the direction of the detected obstacle or so as to cover an imaging region up to the detected obstacle.

More specifically, the synthesizing processing unit 453 performs a process of reducing, in the normal bird's-eye view video 120, display areas by shifting the left side video 123 and the right side video 124 forward. Hereinafter, this process will be referred to as a shift process. In other words, the synthesizing processing unit 453 generates videos by clipping regions containing rear sides, which correspond to the direction of the detected obstacle, of the left side video 123 and the right side video 124 of the normal bird's-eye view video 120. For example, the synthesizing processing unit 453 generates videos for which display areas are reduced by performing the shift process of shifting a left side video 103B and a right side video 104B forward so as to cover regions on the rear sides from side mirrors. In this case, a display area of a subject vehicle icon 200B is reduced by shifting the vehicle icon 200B forward through the shift process similarly to the left side video 103A and the right side video 104A. The synthesizing processing unit 453 extends the imaging region so as to cover a wide imaging region in the direction of the detected obstacle or so as to cover an imaging region up to the detected obstacle, and performs the process of clipping the surroundings video in the direction in which the obstacle has been detected. Then, the synthesizing processing unit 453 generates the bird's-eye view video 100B by synthesizing the compressed video and the rear video 102 that is obtained by performing the viewpoint conversion process on the surroundings video data containing the imaging region that has been extended in the direction of the detected obstacle.

The bird's-eye view video 100B obtained when the obstacle is detected on the rear side will be described with reference to FIG. 8. A bird's-eye view video 110B contains a front video 101B, a rear video 102B, the left side video 103B, and the right side video 104B. The front video 101B and the rear video 102B are the same videos as the front video 101 and the rear video 102 of the bird's-eye view video 100 of the first embodiment. The display area of the left side video 103B is reduced by performing the shift process of shifting the left side video 123 of the normal bird's-eye view video 120 forward. More specifically, the left side video 103B is clipped so as to contain the surroundings video of the left rear from the left side mirror of the vehicle without containing the surroundings video of the left front from the left side mirror of the vehicle. The display area of the right side video 104B is reduced by performing the shift process of shifting the right side video 124 of the normal bird's-eye view video 120 forward. More specifically, the right side video 104B is clipped so as to contain the surroundings video of the right rear from the right side mirror of the vehicle without containing the surroundings video of the right front from the right side mirror of the vehicle. The vehicle icon 200B is a video obtained by performing the shift process of shifting the vehicle icon 210 of the normal bird's-eye view video 120 forward.

As described above, in the present embodiment, when the obstacle is detected, the bird's-eye view video 100B is generated, in which the display area is reduced by performing the shift process of shifting the normal bird's-eye view video 120 in the direction opposite to the direction in which the obstacle has been detected and which contains the imaging region up to the detected obstacle in the direction in which the obstacle has been detected. For example, in the present embodiment, when the obstacle is detected on the rear of the vehicle, the bird's-eye view video 100B is generated by performing the shift process on the left side video 123 and the right side video 124 of the normal bird's-eye view video 120, and synthesizing the video that is obtained by performing the viewpoint conversion process on the surroundings video, which is obtained from the rear camera 12 and in which the imaging region has been extended in the direction in which the obstacle has been detected. With this configuration, in the present embodiment, when the obstacle is detected, it is possible to display the bird's-eye view video 100B, in which the imaging region has been extended up to the obstacle, in the same display region as the normal bird's-eye view video 120. In this manner, in the present embodiment, it is possible to check the obstacle around the vehicle appropriately.

In the present embodiment, the display area is reduced by performing the shift process on the normal bird's-eye view video 120 in the direction opposite to the direction in which the obstacle has been detected, so that the display region for displaying the information indicating the obstacle is ensured. In the present embodiment, the region that is excluded from the compressed bird's-eye view video 100B is a region that can be viewed and checked directly by the driver facing the front of the vehicle. Therefore, it is possible to ensure the display region for displaying the information indicating the obstacle without reducing information on a region that is not easily viewable for the driver.

Fourth Embodiment

Figure 9:
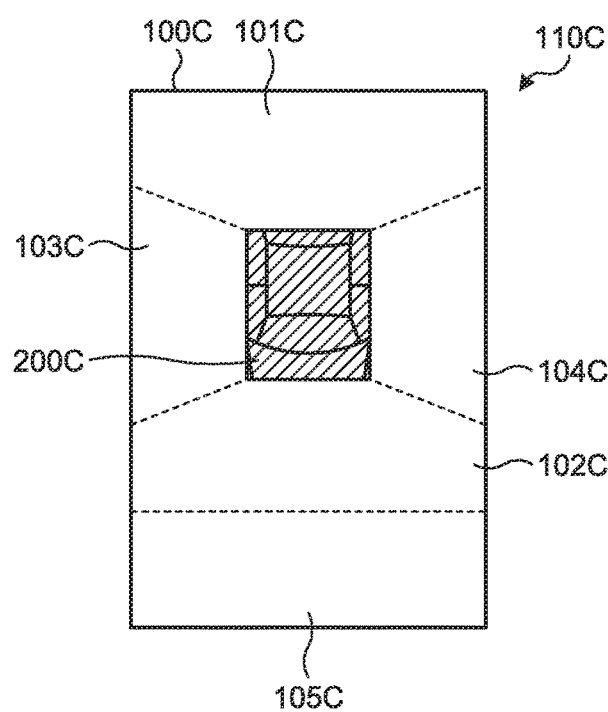
FIG. 9 is a diagram illustrating a bird's-eye view video generated by a bird's-eye view video generation system according to a fourth embodiment.

A bird's-eye view video generation system 1 according to a fourth embodiment will be described with reference to FIG. 9. FIG. 9 is a diagram illustrating a bird's-eye view video generated by the bird's-eye view video generation system according to the fourth embodiment. The bird's-eye view video generation system 1 of the present embodiment is different from the bird's-eye view video generation system 1 of the second embodiment in that the synthesizing processing unit 453 performs different processes.

When the obstacle information acquiring unit 43 detects the obstacle, the synthesizing processing unit 453 generates a bird's-eye view video 110C by compressing the normal bird's-eye view video 120 by shifting the normal bird's-eye view video 120 in the direction opposite to the direction in which the obstacle has been detected, and synthesizing, in the direction in which the obstacle has been detected, the surroundings video that is obtained from the rear camera 12 arranged in the direction of the detected obstacle and that is not converted the viewpoint conversion process.

The bird's-eye view video 110C obtained when the obstacle is detected on the rear side will be described with reference to FIG. 9. A bird's-eye view video 110C includes the bird's-eye view video 100C, which contains a front video 101C, a rear video 102C, a left side video 103C, and a right side video 104C and in which a display area is reduced, and a second rear video 105C. The front video 101C and the rear video 102C are the same videos as the front video 101A and the rear video 102A of the bird's-eye view video 110A of the second embodiment. The left side video 103C and the right side video 104C are the same videos as the left side video 103B and the right side video 104B of the third embodiment. The second rear video 105C is the same video as the second rear video 105A of the second embodiment. A vehicle icon 200C is the same video as the subject vehicle icon 200B of the third embodiment.

As described above, in the present embodiment, when the obstacle is detected, the bird's-eye view video 110C is generated by reducing the display area by performing the shift process on the normal bird's-eye view video 120 in the direction opposite to the direction in which the obstacle has been detected, and synthesizing, in the direction in which the obstacle has been detected, the surroundings video corresponding to the direction of the detected obstacle, so that the display region is extended in the direction in which the obstacle has been detected. For example, in the present embodiment, when the obstacle is detected on the rear of the vehicle, the bird's-eye view video 110C is generated by performing the shift process on the left side video 123 and the right side video 124 of the normal bird's-eye view video 120, and synthesizing the second rear video 105C that is the surroundings video obtained from the rear camera 12 arranged in the direction in which the obstacle has been detected. With this configuration, in the present embodiment, when the obstacle is detected, it is possible to display, in the same display region as the normal bird's-eye view video 120, the bird's-eye view video 110C in which the compressed bird's-eye view video 100C and the second rear video 105C that is not converted by the viewpoint conversion process in the direction in which the obstacle has been detected are synthesized. In this manner, in the present embodiment, it is possible to check the obstacle around the vehicle appropriately.

Fifth Embodiment

Figure 10:
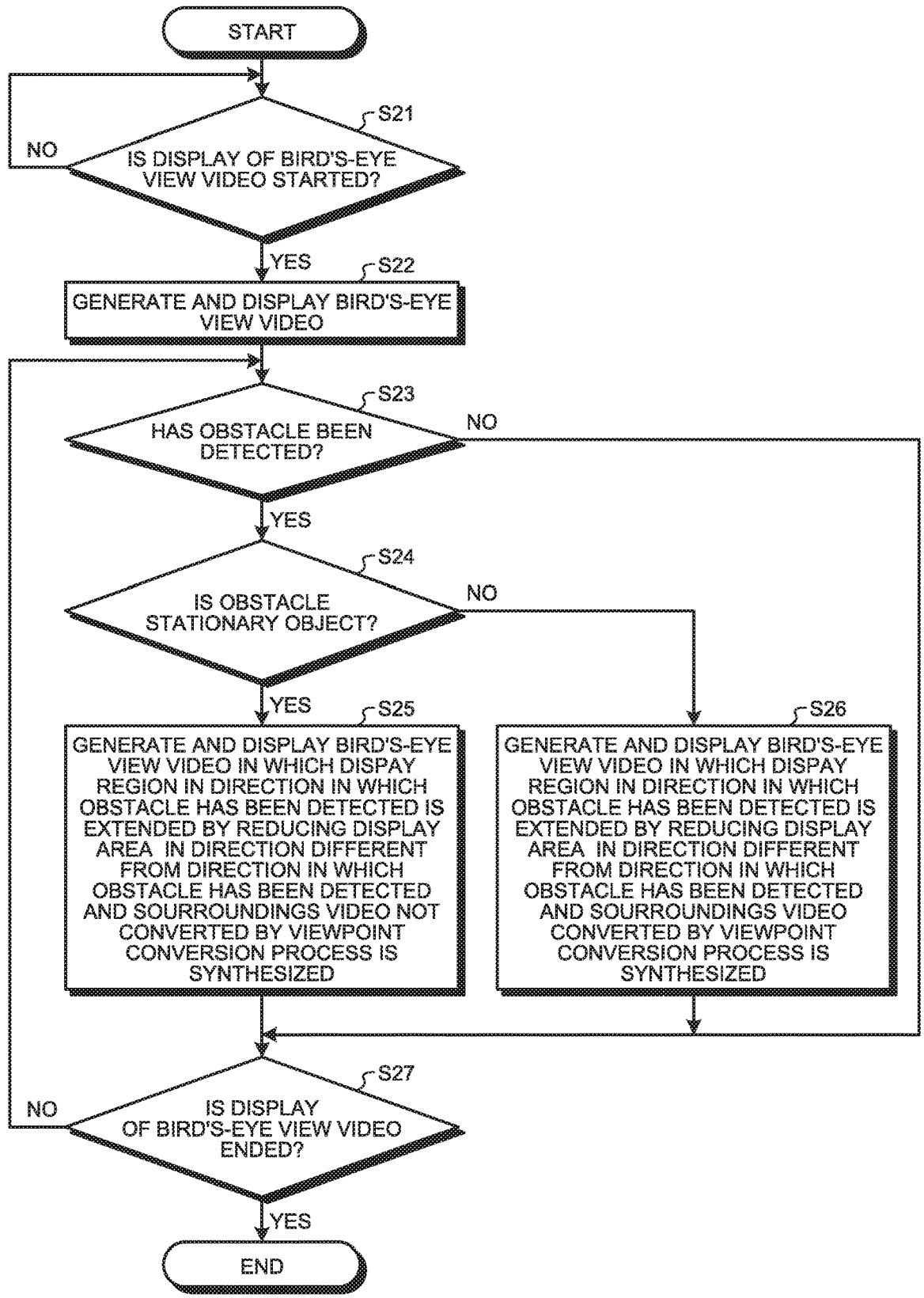
FIG. 10 is a flowchart illustrating flow of processes performed by a bird's-eye view video generation device of a bird's-eye view video generation system according to a fifth embodiment.

A bird's-eye view video generation system 1 according to a fifth embodiment will be described with reference to FIG. 10. FIG. 10 is a flowchart illustrating flow of processes performed by a bird's-eye view video generation device of the bird's-eye view video generation system according to the fifth embodiment. The bird's-eye view video generation system 1 of the present embodiment is different from the bird's-eye view video generation systems 1 of the first embodiment and the second embodiment in that the synthesizing processing unit 453 performs different processes.

When the obstacle information acquiring unit 43 detects the obstacle, the synthesizing processing unit 453 switches a video to be displayed between the bird's-eye view video 100 and the bird's-eye view video 110A depending on whether the obstacle is a stationary object. More specifically, if the synthesizing processing unit 453 determines that the obstacle is a stationary object, the synthesizing processing unit 453 generates the bird's-eye view video 110A similarly to the second embodiment. If the synthesizing processing unit 453 determines that the obstacle is not a stationary object, the synthesizing processing unit 453 generates the bird's-eye view video 100 similarly to the first embodiment.

The flow of processes performed by the bird's-eye view video generation device 40 of the bird's-eye view video generation system 1 will be described below with reference to FIG. 10. Processes at Step S21 to Step S23 and Step S27 are the same as the processes at Step S11 to Step S13 and Step S15 of the first embodiment.

The controller 41 determines whether the obstacle is a stationary object (Step S24). The controller 41 performs image processing on the surroundings video, detects the obstacle in an image corresponding to the obstacle detected by the sensor, and determines whether the obstacle is moving. If the controller 41 determines that the obstacle is not moving, the controller 41 determines that the obstacle is a stationary object. If the controller 41 determines that the obstacle is moving, the controller 41 determines that the obstacle is not a stationary object. If the controller 41 determines that the obstacle is a stationary object (YES at Step S24), the controller 41 proceeds to Step S25. If the controller 41 determines that the obstacle is not a stationary object (NO at Step S24), the controller 41 proceeds to Step S26.

The controller 41 generates and displays the bird's-eye view video 110A, in which the display area is reduced in the direction different from the direction in which the obstacle has been detected, and in which the surroundings video for which the display region has been extended without being converted by the viewpoint conversion process is synthesized (Step S25). More specifically, the controller 41 causes the synthesizing processing unit 453 to generate the bird's-eye view video 110A by synthesizing the bird's-eye view video 100A in which the display area of the video in at least one direction different from the direction in which the obstacle has been detected is reduced, and the surroundings video which is obtained from the rear camera 12 arranged in the direction in which the obstacle has been detected and for which the display region has been extended.

When the obstacle is a stationary object, the position of the obstacle does not change. Therefore, it is easier for the driver to check the position and the shape of the obstacle with use of the bird's-eye view video 110A, in which the surroundings video that is not converted by the viewpoint conversion process is synthesized.

The controller 41 generates and displays the bird's-eye view video 110A, in which the display area is reduced in the direction different from the direction in which the obstacle has been detected, and in which the surroundings video converted by the viewpoint conversion process is synthesized (Step S26). The controller 41 causes the synthesizing processing unit 453 to generate the bird's-eye view video 100 by reducing the display area of the video in at least one direction different from the direction in which the obstacle has been detected, extending, in the direction in which the obstacle has been detected, the display region so as to cover a wide imaging region in the direction of the detected obstacle, and performing the viewpoint conversion process.

When the obstacle is not a stationary object, in other words, when the obstacle is a moving object, a relative positional relationship between the obstacle and the vehicle will change. Therefore, it is easier for the driver to check the relative positional relationship with respect to the obstacle with use of the bird's-eye view video 100.

As described above, according to the present embodiment, it is possible to switch the video to be displayed between the bird's-eye view video 100 and the bird's-eye view video 110A depending on whether the obstacle is a stationary object. With this configuration, in the present embodiment, it is possible to generate and display the bird's-eye view video 100 or the bird's-eye view video 110A so that the driver can easily check the obstacle depending on whether the obstacle is a stationary object or a moving object. In this manner, in the present embodiment, it is possible to check the obstacle around the vehicle appropriately both when the obstacle is a stationary object and when the obstacle is a moving object.

Sixth Embodiment

A bird's-eye view video generation system 1 according to the present embodiment will be described with reference to FIG. 11. FIG. 11 is a flowchart illustrating flow of processes performed by a bird's-eye view video generation device of the bird's-eye view video generation system according to the sixth embodiment. The bird's-eye view video generation system 1 of the present embodiment is different from the bird's-eye view video generation system 1 of the fifth embodiment in that the synthesizing processing unit 453 performs different processes.

When the obstacle information acquiring unit 43 detects the obstacle, the synthesizing processing unit 453 switches the video to be displayed between the bird's-eye view video 100 and the bird's-eye view video 110A depending on whether a distance to the obstacle is within the display region of the normal bird's-eye view video 120. More specifically, if the synthesizing processing unit 453 determines that the distance to the obstacle is within the display region of the normal bird's-eye view video 120, the synthesizing processing unit 453 generates the bird's-eye view video 110A similarly to the second embodiment. If the synthesizing processing unit 453 determines that the distance to the obstacle is out of the display region of the normal bird's-eye view video 120, the synthesizing processing unit 453 generates the bird's-eye view video 100 similarly to the first embodiment.

The flow of processes performed by the bird's-eye view video generation device 40 of the bird's-eye view video generation system 1 will be described below with reference to FIG. 11. Processes at Step S31 to Step S33 and Step S35 to Step S37 are the same as the processes at Step S21 to Step S23 and Step S25 to Step S27 of the fifth embodiment.

The controller 41 determines whether the distance to the obstacle is within the display region of the normal bird's-eye view video 120 (Step S34). If the controller 41 determines that the distance to the obstacle is within the display region of the normal bird's-eye view video 120 (YES at Step S34), the controller 41 proceeds to Step S35. If the controller 41 determines that the distance to the obstacle is out of the display region of the normal bird's-eye view video 120 (NO at Step S34), the controller 41 proceeds to Step S36.

If the distance to the obstacle is within the display region of the normal bird's-eye view video 120, the obstacle is contained in the normal bird's-eye view video 120. Therefore, if the distance to the obstacle is within the display region of the normal bird's-eye view video 120, the driver is able to check the obstacle with use of the bird's-eye view video 100A for which the display area is reduced. In addition, by synthesizing the second rear video 105A that is not converted by the viewpoint conversion processing, it becomes easier for the driver to check the obstacle.

If the distance to the obstacle is out of the display region of the normal bird's-eye view video 120, the driver is able to check the obstacle with use of the bird's-eye view video 100.

As described above, according to the present embodiment, it is possible to switch the video to be displayed between the bird's-eye view video 100 and the bird's-eye view video 110A depending on whether the distance to the obstacle is within the display region of the normal bird's-eye view video 120. With this configuration, in the present embodiment, it is possible to generate and display the bird's-eye view video 100 or the bird's-eye view video 110A so that the driver can easily check the obstacle depending on whether the distance to the obstacle is within the display region of the normal bird's-eye view video 120. In this manner, in the present embodiment, it is possible to check the obstacle around the vehicle appropriately regardless of the distance to the obstacle.

While the bird's-eye view video generation systems 1 according to the present application have been described above, the present application may be embodied in various different modes other than the embodiments as described above.

The components of the bird's-eye view video generation system 1 illustrated in the drawings are functionally conceptual and do not necessarily have to be physically configured in the manner illustrated in the drawings. In other words, specific forms of the devices are not limited to those illustrated in the drawings, and all or part of the devices may be functionally or physically distributed or integrated in arbitrary units depending on various loads or use conditions.

The configuration of the bird's-eye view video generation system 1 is realized as software by, for example, a program or the like loaded on a memory. In the embodiments described above, it is explained that the functional blocks are implemented by cooperation with hardware or software. In other words, the functional blocks are realized in various forms using only hardware, using only software, or using a combination of hardware and software.

The components described above include one that can easily be thought of by a person skilled in the art and one that is practically identical. Further, the configurations described above may be combined appropriately. Furthermore, within the scope not departing from the gist of the present disclosure, various omission, replacement, and modifications of the components may be made.

The determination conditions adopted at Step S24 and Step S34 in the fifth embodiment and the sixth embodiment are one example and not specifically limited. For example, it may be possible to adopt a height of the obstacle from the ground as a determination condition. The bird's-eye view video is a video obtained by performing a viewpoint conversion process such that surroundings of the vehicle are looked down from above, and therefore, a height of a captured object from the ground in the bird's-eye view video is not clear. Therefore, for example, when the height of the obstacle from the ground is equal to or higher than a predetermined height, the synthesizing processing unit 453 may generate the bird's-eye view video 110A similarly to the second embodiment. For another example, when the height of the obstacle from the ground is lower than the predetermined height, the synthesizing processing unit 453 may generate the bird's-eye view video 100 similarly to the first embodiment.

When the synthesizing processing unit 453 reduces the display area of the video in at least one direction different from the direction in which the obstacle has been detected in the normal bird's-eye view video 120, the synthesizing processing unit 453 may perform the compression process such that central portions of the left side video 123 and the right side video 124 in the vertical direction are displayed in the manner of being compressed in the vertical direction. Alternatively, the bird's-eye view video generating unit 45 may reduce the display area by deleting the central portions of the left side video 123 and the right side video 124 in the vertical direction. Alternatively, the bird's-eye view video generating unit 45 may reduce the display area by deleting both end portions of the left side video 123 and the right side video 124 while maintaining central portions in the vertical direction.

The surroundings video that is not converted by the viewpoint conversion process, which is described as one example of the information indicating the obstacle, may be a video that is obtained by clipping surroundings of the obstacle from the surroundings video and enlarging the clipped video.

It is explained that the synthesizing processing unit 453 generates the bird's-eye view video 110A by synthesizing the bird's-eye view video 100A for which the display area is reduced and the second rear video 105A that is not converted by the viewpoint conversion process. However, it may be possible to generate a bird's-eye view video by synthesizing the bird's-eye view video 100A for which the display area is reduced and a video that contains, as another example of the information indicating the obstacle, an icon representing the obstacle, text indicating the presence of the obstacle and a distance to the obstacle, or the like.

It is explained that, when the obstacle is detected on the rear of the vehicle, the synthesizing processing unit 453 generates the bird's-eye view video in which the display areas of the left side video 123 and the right side video 124 of the normal bird's-eye view video 120 are reduced. However, it may be possible to reduce the display area of the front video 121, or reduce the display areas of the left side video 123, the right side video 124, and the front video 121.

It is explained that the synthesizing processing unit 453 reduces the display areas of the left side video 123 and the right side video 124 of the normal bird's-eye view video 120. However, it may be possible to generate a bird's-eye view video by first performing the process of reducing display areas on the surroundings video data obtained from the cameras, and subsequently performing the viewpoint conversion process on the reduced surroundings video data.

When multiple obstacles are present, the controller 41 may synthesize the surroundings video data that is acquired from a certain camera corresponding to a direction in which the obstacle with a high priority is detected. For example, an order of the priority may be determined such that the highest priority is given to the obstacle located at the shortest distance. Alternatively, for example, the order of the priority may be determined such that the highest priority is given to the obstacle that is a moving object. Alternatively, for example, the order of the priority may be determined such that the highest priority is given to the obstacle that is a moving object and that is coming close the vehicle. Alternatively, for example, when the obstacles are present in both of the front-rear direction and the left-right direction while the moving direction of the vehicle is not determined, the highest priority may be given to the obstacle that is present in the front-rear direction.

The controller 41, at Step S13, may determine whether to start displaying the bird's-eye view video depending on, for example, whether or not operation of starting the display of the bird's-eye view video on an operating unit by the driver is detected.

According to the present application, it is possible to appropriately display a detected obstacle in a display region of the bird's-eye view video.

Although the application has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A bird's-eye view video generation device comprising:
   a video data acquiring unit configured to acquire videos from a plurality of cameras configured to capture videos of front, rear, a left side, and a right side of a vehicle;
   an obstacle information acquiring unit configured to acquire information from an obstacle sensor configured to detect at least one obstacle around the vehicle;
   a bird's-eye view video generating unit configured to:
      generate a bird's-eye view video in which the vehicle is viewed from above by synthesizing videos that are obtained by performing a viewpoint conversion process on the videos acquired by the video data acquiring unit; and
   generate, when the obstacle information acquiring unit detects the obstacle, the bird's-eye view video in which a display region of the bird's-eye view video in a direction in which the obstacle has been detected is extended by reducing a display area of the video in a direction orthogonal to the direction in which the obstacle has been detected toward a direction opposite to the direction in which the obstacle has been detected; and
   a display controller configured to display the bird's-eye view video generated by the bird's-eye view video generating unit on a display, wherein
   the bird's-eye view video generating unit is further configured to generate, when the obstacle information acquiring unit detects the obstacle, the bird's-eye view video reduced by compressing the display area of the video in the direction orthogonal to the direction in which the obstacle has been detected.

2. The bird's-eye view video generation device according to claim 1, wherein the bird's-eye view video generating unit is further configured to generate the bird's-eye view video by extending the display region in the direction in which the obstacle has been detected in the bird's-eye view video so as to cover an imaging region up to the detected obstacle.

3. The bird's-eye view video generation device according to claim 1, wherein
   the bird's-eye view video generating unit is further configured to generate, when a distance to the obstacle detected by the obstacle information acquiring unit is within the display region of the bird's-eye view video in a case in which the obstacle is not detected, the bird's-eye view video in which the display region in the direction in which the obstacle has been detected is extended so as to cover an imaging region up to the detected obstacle in the direction in which the obstacle has been detected by reducing the display area of the video in the direction orthogonal to the direction in which the obstacle has been detected toward the direction opposite to the direction in which the obstacle has been detected.

4. The bird's-eye view video generation device according to claim 1, wherein
   the bird's-eye view video generating unit is further configured to generate, when a distance to the obstacle detected by the obstacle information acquiring unit is out of the display region of the bird's-eye view video in a case in which the obstacle is not detected, the bird's-eye view video in which the display region in the direction in which the obstacle has been detected is extended so as to cover an imaging region up to the detected obstacle in the direction in which the obstacle has been detected by reducing the display area of the video in the direction orthogonal to the direction in which the obstacle has been detected toward the direction opposite to the direction in which the obstacle has been detected.

5. The bird's-eye view video generation device according to claim 1, wherein
the bird's-eye view video generating unit is further configured to generate, when the obstacle information acquiring unit detects the obstacle, the bird's-eye view video in which the display region in the direction in which the obstacle has been detected is extended so as to cover an imaging region up to the detected obstacle in the direction in which the obstacle has been detected by reducing the display area of the video in the direction orthogonal to the direction in which the obstacle has been detected toward the direction opposite to the direction in which the obstacle has been detected, and which is converted by the viewpoint conversion process.

6. The bird's-eye view video generation device according to claim 1, wherein
the bird's-eye view video generating unit is further configured to generate, when the obstacle information acquiring unit detects the obstacle, the bird's-eye view video in which the display region in the direction in which the obstacle has been detected is extended so as to cover an imaging region up to the detected obstacle in the direction in which the obstacle has been detected by reducing the display area of the video in the direction orthogonal to the direction in which the obstacle has been detected toward the direction opposite to the direction in which the obstacle has been detected, and which is not converted by the viewpoint conversion process.

7. The bird's-eye view video generation device according to claim 1, wherein
the bird's-eye view video generating unit is further configured to generate, when the obstacle information acquiring unit detects the obstacle, the bird's-eye view video reduced by shifting the video in the direction orthogonal to the direction in which the obstacle has been detected toward the direction opposite to the direction in which the obstacle has been detected.

8. A bird's-eye view video generation system comprising:
the bird's-eye view video generation device according to claim 1; and
at least one of the cameras, the obstacle sensor, and the display unit.

9. A bird's-eye view video generation method comprising:
acquiring videos from a plurality of cameras configured to capture videos of front, rear, a left side, and a right side of a vehicle;
acquiring information from an obstacle sensor configured to detect at least one obstacle around the vehicle;
generating a bird's-eye view video in which the vehicle is viewed from above by synthesizing videos that are obtained by performing a viewpoint conversion process on the acquired videos;
generating, when detecting the obstacle, the bird's-eye view video in which a display region of the bird's-eye view video in a direction in which the obstacle has been detected is extended by reducing a display area of the video in a direction orthogonal to the direction in which the obstacle has been detected toward a direction opposite to the direction in which the obstacle has been detected; and
displaying the generated bird's-eye view video on a display, wherein on generating the bird's-eye view video when detecting the obstacle, the bird's-eye view video is reduced by compressing the display area of the video in the direction orthogonal to the direction in which the obstacle has been detected.

10. A non-transitory storage medium that stores a program causing a computer that operates as a bird's-eye view video generation device to execute:
acquiring information from an obstacle sensor configured to detect at least one obstacle around the vehicle;
generating a bird's-eye view video in which the vehicle is viewed from above by synthesizing videos that are obtained by performing a viewpoint conversion process on the acquired videos;
generating, when detecting the obstacle, the bird's-eye view video in which a display region of the bird's-eye view video in a direction in which the obstacle has been detected is extended by reducing a display area of the video in a direction orthogonal to the direction in which the obstacle has been detected toward a direction opposite to the direction in which the obstacle has been detected; and
displaying the generated bird's-eye view video on a display, wherein
on generating the bird's-eye view video when detecting the obstacle, the bird's-eye view video is reduced by compressing the display area of the video in the direction orthogonal to the direction in which the obstacle has been detected.

* * * * *